US006930600B1

(12) United States Patent
Hsieh

(10) Patent No.: US 6,930,600 B1
(45) Date of Patent: Aug. 16, 2005

(54) IMAGE AND AUDIO DATA PROCESSING SYSTEM

(75) Inventor: Tung-Ming Hsieh, Taipei Hsien (TW)

(73) Assignee: Hi-Touch Imaging Technologies Co., Ltd., Pan-Chiao (TW)

( * ) Notice: Subject to any disclaimer, the term of this patent is extended or adjusted under 35 U.S.C. 154(b) by 0 days.

(21) Appl. No.: 10/709,424

(22) Filed: May 5, 2004

(30) Foreign Application Priority Data

Feb. 6, 2004 (TW) .............................. 93102835 A

(51) Int. Cl.[7] ............................ H04Q 7/00; G09F 1/00
(52) U.S. Cl. .............................. 340/539.1; 340/384.1; 340/692; 40/124.01; 40/124.03; 40/124.12; 446/147; 358/503; 434/318
(58) Field of Search .......................... 340/539.1, 384.1, 340/691.1, 692, 384.6, 384.7; 283/117; 40/124.01, 40/124.11, 124.03, 124.12, 455; 446/147, 446/148; 358/503; 434/311, 317, 318; 346/76.1

(56) References Cited

U.S. PATENT DOCUMENTS

| | | | | |
|---|---|---|---|---|
| 5,502,463 | A * | 3/1996 | Sasaki et al. | 345/204 |
| 6,363,239 | B1 * | 3/2002 | Tutt et al. | 434/317 |
| 6,441,921 | B1 * | 8/2002 | Soscia | 358/1.9 |
| 6,563,563 | B2 * | 5/2003 | Adams et al. | 355/31 |

* cited by examiner

*Primary Examiner*—Donnie L. Crosland
(74) *Attorney, Agent, or Firm*—Winston Hsu

(57) ABSTRACT

An image and audio processing system includes a housing, a storage medium, a non-contact audio storage device installed inside the housing for storing audio data in the storage medium by wireless communication technology, and a print device installed inside the housing for printing an image on the storage medium.

16 Claims, 3 Drawing Sheets

IMAGE AND AUDIO DATA PROCESSING SYSTEM

BACKGROUND OF INVENTION

1. Field of the Invention

The present invention relates to an image and audio processing system, and more particularly, to an image and audio processing system for storing audio data in a storage medium with a non-contact audio storage device and for printing an image on the storage medium with a print device.

2. Description of the Prior Art

Nowadays there are many kinds of greeting cards, such as birthday cards, New Year's cards, Christmas cards, and so on. People who receive greeting cards are influenced by both the patterns and the words on the cards, which help to convey the emotions of the people who sent the cards. Among these cards, some cards provide not only visual messages, such as patterns and words, but also sound messages, such as Christmas cards with Christmas music. Card receivers can look at cards and listen to sound messages from cards at the same time, which has a stronger effect than receiving cards with only patterns or words.

However, an audio greeting card in the market always has an IC memory storing sound data for providing sound messages, and the audio greeting card only plays the sound data stored in the IC. Normal users cannot modify the contents of sound data by themselves so that sound contents of cards are always dull and lack of personal uniqueness. In addition, the conventional audio greeting card plays the sound data stored in the IC memory by a contact method. Unfortunately, when the audio greeting card has imperfect contact or suffers from an imperfect opening design, the sounds cannot be played smoothly after a user opens the card. As a result, the sound provided by the audio greeting card is less effective.

SUMMARY OF INVENTION

It is therefore a primary objective of the claimed invention to provide an image and audio processing system to solve the above-mentioned problems.

According to the claimed invention, an image and audio processing system includes a housing, a storage medium, a non-contact audio storage device installed inside the housing for storing audio data in the storage medium by wireless communication technology, and a print device installed inside the housing for printing an image on the storage medium.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
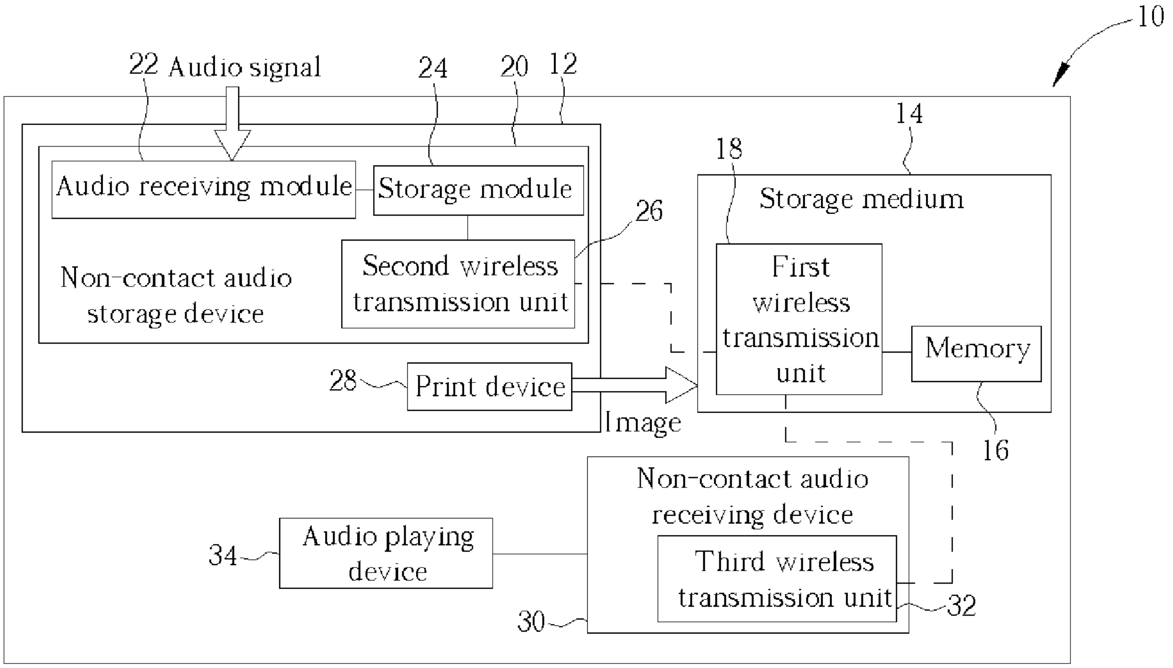
FIG. 1 is a functional block diagram of an image and audio processing system.

Please refer to FIG. 1. FIG. 1 is a functional block diagram of an image and audio processing system 10. The image and audio processing system 10 includes a first housing 12, and a storage medium 14 such as a card. The storage medium 14 includes a memory 16 for storing audio data, and a first wireless transmission unit 18 for receiving audio data by wireless communication technology. The image and audio processing system 10 further includes a non-contact audio storage device 20 installed inside the first housing 12 for storing audio data in the storage medium 14 by wireless communication technology. The non-contact audio storage device 20 includes an audio receiving module 22 for receiving audio signals, such as a microphone or audio signal receiving ports, a storage module 24 for storing the audio signal received by the audio receiving module 22, and a second wireless transmission unit 26 for transmitting audio data to the first wireless transmission unit 18 by wireless communication technology. The image and audio processing system 10 further includes a print device 28 installed inside the first housing 12 for printing an image on the storage medium 14. The print device 28 can print the image on the storage medium 14 by thermal printing technology.

Please continue referring to FIG. 1. The image and audio processing system 10 further includes a non-contact audio receiving device 30 for receiving audio data stored in the storage medium 14 by wireless communication technology. The non-contact audio receiving device 30 includes a third wireless transmission unit 32 for receiving audio data from the first wireless transmission unit 18 by wireless communication technology, and an audio playing device 34 for converting the audio data received by the non-contact audio receiving device 30 into acoustic sounds and for playing the acoustic sounds. The audio playing device 34 can be a speaker, an earphone, and so on.

Figure 2:
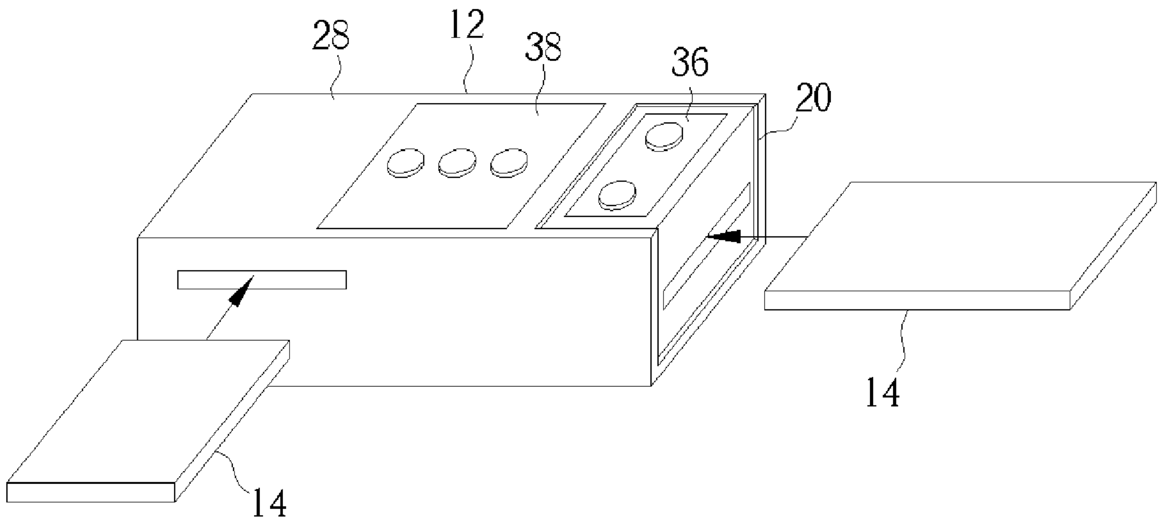
FIG. 2 is a drawing illustrating a non-contact audio storage device and a print device inputting data to a storage medium.

Please refer to FIG. 2. FIG. 2 is a drawing illustrating the non-contact audio storage device 20 and the print device 28 inputting data to the storage medium 14. The non-contact audio storage device 20 and the print device 28 are both installed inside the first housing 12. The storage medium 14 can be put inside the non-contact audio storage device 20, and then a user can operate a first control button set 36 installed on the non-contact audio storage device 20 to control the non-contact audio storage device 20 to store the audio data in the storage medium 14. Please refer to FIG. 1. The audio data can be transmitted from the second wireless transmission unit 26 of the non-contact audio storage device 20 to the first wireless transmission unit 18 of the storage medium 14 by wireless communication technology. The wireless communication technology can be a wave-radio communication technology. After the first wireless transmission unit 18 of the storage medium 14 receives the audio data, the audio data can be stored in the memory 16. The memory 16 can be a flash memory, such as a NAND FLASH and a NOR FLASH, or an erasable memory, such as EPROM and EEP-ROM. That is, different audio data can be written in the memory 16 repeatedly. As regards to the source of the audio data in the non-contact audio storage device 20, the audio receiving module 22 can receive audio data from the external source. For example, the audio receiving module 22 can receive words spoken by a sender with a microphone or receive audio files with audio signal receiving ports. The audio data received by the audio receiving module 22 can be stored in the storage module 24. The audio data stored in the storage module 24 can be transmitted to the second wireless transmission unit 26 and then transmitted to the storage medium 14 when a user wants to store the audio data from the non-contact audio storage device 20 in the storage medium 14.

In addition, the storage medium 14 can be put inside the print device 28, and then a user can operate a second control button set 38 for printing an image on the surface of the storage medium 14. The print device 28 can print the image on the storage medium 14 by thermal printing technology. In conclusion, the image data can be printed on the surface of the storage medium 14 with the print device 28, and the audio data can be transmitted from the non-contact audio storage device 20 by wireless communication technology and stored in the memory 16 of the storage medium 14.

Figure 3:
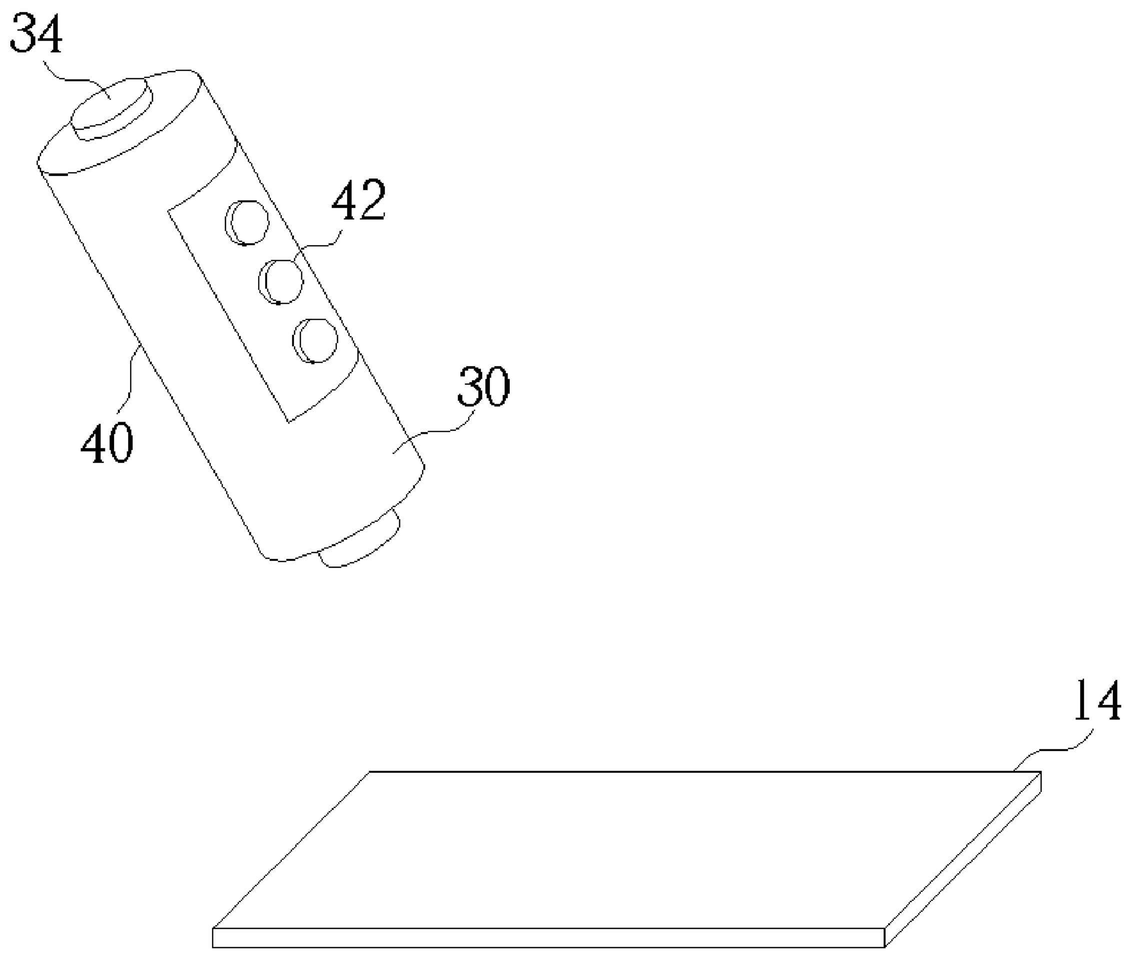
FIG. 3 is a drawing illustrating a non-contact audio receiving device receiving audio data stored in the storage medium.

Please refer to FIG. 3. FIG. 3 is a drawing illustrating the non-contact audio receiving device 30 receiving audio data stored in the storage medium 14. The non-contact audio receiving device 30 and the audio playing device 34 are both installed inside a second housing 40. A user can operate a third control button set 42 of the non-contact audio receiving device 30 to control the non-contact audio receiving device 30 to receive the audio data in the storage medium 14. Please refer to FIG. 1. The audio data stored in the memory 16 of the storage medium 14 can be transmitted to the first wireless transmission unit 18 of the storage medium 14, and the third wireless transmission unit 32 of the non-contact audio receiving device 30 can receive the audio data from the first wireless transmission unit 18 of the storage medium 14 by wireless communication technology. The wireless communication technology can be a wave-radio communication technology. The user also can operate the third control button set 42 to transmit the audio data received by the non-contact audio receiving device 30 to the audio playing device 34 for playing the audio data. The audio playing device 34 can convert the audio data received by the non-contact audio receiving device 30 into acoustic sounds and can play the acoustic sounds. The audio playing device 34 can be a speaker, an earphone, and so on.

In the above embodiment, the non-contact audio storage device 20 and the print device 28 are both installed inside the same first housing 12. And the non-contact audio receiving device 30 and the audio playing device 34 are both installed inside the same second housing 40. It is based on the design that the sound input device and the image input device are installed inside the same housing and the sound receiving device and the sound playing device are installed inside the same housing. In this manner, manufacturers can manufacture either of the audio and image input device and sound receiving and playing device. Basically the non-contact audio storage device 20, the print device 28, the non-contact audio receiving device 30, and the audio playing device 34 can be all installed inside the same housing, or the non-contact audio receiving device 30 and the audio playing device 34 can be installed inside the different housings. Either setup can be used depending on design demand.

In contrast to the prior art, the storage medium according to the present invention can be a card storing audio data for providing an image message and a sound message. The mechanism of storing audio data in the storage medium and reading audio data from the storage medium is in wireless communication technology, so it can improve the disadvantage of the imperfect contact of the audio greeting card. In addition, the memory of the storage medium can be a rewritable memory for storing different audio data repeatedly. Therefore, the present invention can also improve the disadvantage of lack of personal uniqueness in the prior art. The non-contact audio receiving device according to the present invention can allow users to listen to audio data read by the non-contact audio receiving device, and at the same time users can see image messages printed on the storage medium. So the visual and sound effects can be experienced at the same time and can be customized easily.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An image and audio processing system comprising:

a housing;

a storage medium;

a non-contact audio storage device installed inside the housing for storing audio data in the storage medium by wireless communication technology; and a print device installed inside the housing for printing an image on the storage medium.

2. The image and audio processing system of claim 1 wherein the storage medium comprises a memory for storing audio data, and a first wireless transmission unit for receiving audio data by wireless communication technology.

3. The image and audio processing system of claim 2 wherein the non-contact audio storage device comprises a second wireless transmission unit for transmitting audio data to the first wireless transmission unit by wireless communication technology.

4. The image and audio processing system of claim 2 further comprising a non-contact audio receiving device for receiving audio data stored in the storage medium by wireless communication technology, and an audio playing device for converting the audio data received by the non-contact audio receiving device into acoustic sounds and for playing the acoustic sounds.

5. The image and audio processing system of claim 4 wherein the non-contact audio receiving device comprises a third wireless transmission unit for receiving audio data from the first wireless transmission unit by wireless communication technology.

6. The image and audio processing system of claim 4 wherein the audio playing device is a speaker.

7. The image and audio processing system of claim 4 wherein the non-contact audio receiving device receives audio data stored in the storage medium via radio waves.

8. The image and audio processing system of claim 1 wherein the non-contact audio storage device stores audio data in the storage medium via radio waves.

9. The image and audio processing system of claim 1 wherein the print device prints the image on the storage medium with thermal printing technology.

10. The image and audio processing system of claim 1 wherein the storage medium is a card.

11. The image and audio processing system of claim 1 wherein the non-contact audio storage device comprises an audio receiving module for receiving an audio signal and a storage module for storing the audio signal received by the audio receiving module.

12. The image and audio processing system of claim 11 wherein the audio receiving module is a microphone.

13. The image and audio processing system of claim 1 further comprising a non-contact audio receiving device for receiving audio data stored in the storage medium by wireless communication technology, and an audio playing device for converting the audio data received by the non-contact audio receiving device into acoustic sounds and for playing the acoustic sounds.

14. The image and audio processing system of claim 13 wherein the non-contact audio receiving device and the audio playing device are installed inside the same housing.

15. The image and audio processing system of claim 13 wherein the non-contact audio receiving device and the audio playing device are installed inside different housings.

16. The image and audio processing system of claim 13 wherein the non-contact audio receiving device and the audio playing device are installed inside the housing.

* * * * *